United States Patent
Chauvel et al.

(10) Patent No.: US 6,452,641 B1
(45) Date of Patent: Sep. 17, 2002

(54) METHOD AND APPARATUS FOR PROVIDING AND ON-SCREEN DISPLAY WITH VARIABLE RESOLUTION CAPABILITY

(75) Inventors: Gerard Chauvel, Antibes; Gerard Benbassat, St-Paul-de-Vence, both of (FR); Brian O. Chae, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/677,658

(22) Filed: Oct. 4, 2000

Related U.S. Application Data (62) Division of application No. 08/962,514, filed on Oct. 31, 1997.
(60) Provisional application No. 60/030,107, filed on Nov. 1, 1996, provisional application No. 60/030,106, filed on Nov. 1, 1996, provisional application No. 60/030,105, filed on Nov. 1, 1996, provisional application No. 60/030,104, filed on Nov. 1, 1996, provisional application No. 60/030,108, filed on Nov. 1, 1996, and provisional application No. 60/029,923, filed on Nov. 1, 1996.

(51) Int. Cl.[7] .................................................. H04N 5/50
(52) U.S. Cl. ....................................... 348/569; 348/564
(58) Field of Search ................................ 348/569, 563, 348/596, 441, 584, 578, 589, 564; 345/764, 781, 788

(56) References Cited

U.S. PATENT DOCUMENTS

| | | | | |
|---|---|---|---|---|
| 4,644,401 A | * | 2/1987 | Gaskins | 348/569 |
| 4,953,027 A | * | 8/1990 | Tong et al. | 348/569 |
| 4,962,427 A | * | 10/1990 | Lunn et al. | 348/569 |
| 5,604,514 A | | 2/1997 | Hancock | |

FOREIGN PATENT DOCUMENTS

| | | |
|---|---|---|
| EP | 0 276 884 A | 8/1988 |
| EP | 0 280 582 A2 | 8/1988 |
| EP | 0 384 419 A | 8/1990 |
| EP | 0 601 647 A | 6/1994 |
| EP | 0 615 223 A | 9/1994 |
| EP | 0 724 249 A1 | 8/1996 |
| WO | WO 86/05910 | 10/1986 |
| WO | WO 91/18353 | 11/1991 |
| WO | WO 97 16788 A | 5/1997 |

* cited by examiner

Primary Examiner—Victor R. Kostak
(74) Attorney, Agent, or Firm—Gerald E. Laws; W. James Brady, III; Frederick J. Telecky, Jr.

(57) ABSTRACT

An on-screen display with variable resolution capability permits respective parts of a screen to be processed according to their respective resolution requirements. For any active window in the on-screen display, the data format used in memory to represent the pixels of that window can be determined, thereby permitting the window resolution to vary from window to window.

17 Claims, 10 Drawing Sheets

METHOD AND APPARATUS FOR PROVIDING AND ON-SCREEN DISPLAY WITH VARIABLE RESOLUTION CAPABILITY

This application is a divisional of copending U.S. Ser. No. 08/962,514 (TI- 24731) filed on Oct. 31, 1997 and hereby incorporated herein by reference. The aforementioned copending application claims priority under 35 U.S.C. 119(e)(1) of U.S. provisional application Serial Nos. 60/030,107 (TI-24441P), 60/030,106 (TI-24442P), 60/030,105 (TI-24443P), 60/030,104 (TI-24630P), 60/030,108 (TI-24646P) and 60/029,923 (TI-22990P), all filed on Nov. 1, 1996 and hereby incorporated herein by reference.

FIELD OF THE INVENTION

The invention relates generally to digital data processing, and more particularly, to digital data processing associated with on-screen displays.

BACKGROUND OF THE INVENTION

Many conventional on-screen display (OSD) techniques disadvantageously require high resolution processing for an entire screen if any part of the screen requires high resolution processing. For example, Table 1 shows the number of bytes required to store a full screen picture 720 pixels×576 lines in different display modes for an OSD system that does not allow mixing of several modes of display in real time on the same screen. When one part of the screen requires 256 colors, the full screen must be 256 colors, even if another part of the screen requires only 2 colors.

TABLE 1

Number of Byte for Full Screen Display

| Display mode | Number of bytes full |
|---|---|
| Bit map 1-bit per pixel | 51,840 |
| Bit map 2-bit per pixel | 103,680 |
| Bit map 4-bit per pixel | 207,360 |
| Bit map 8-bit per pixel | 414,720 |
| 4:4:4 graphic plane | 1,244,160 |
| 4:2:2 video mode | 829,440 |
| 4:2:0 video mode | 622,080 |

The present invention provides for on-screen display with a variable resolution capability that advantageously permits respective parts of a screen to be processed according to their respective resolution requirements, thereby reducing the processing power and memory required to produce the on-screen display. In particular, for any active window in the on-screen display, the invention can determine the data format used in memory to represent the pixels of that window, thereby permitting the window resolution to vary from window to window.

DETAILED DESCRIPTION

Figure 1:
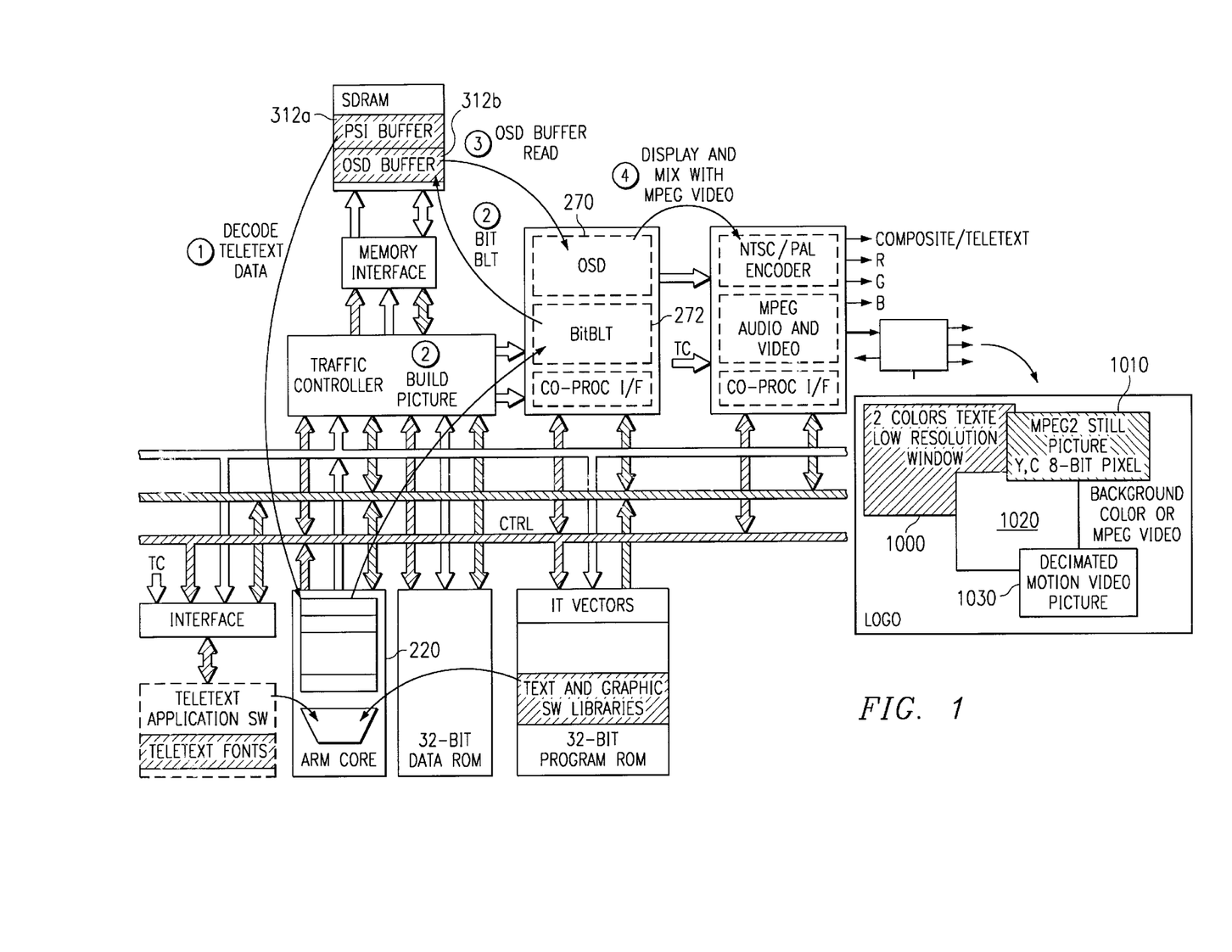
FIG. 1 depicts a high level architectural diagram of an audio/video decoding system employing an OSD coprocessor of the present invention illustrating the global flow of data from decoding to displaying an OSD picture.

The following describes how an OSD controller 270 may be employed to provide OSD (e.g., for use with a digital television set-top box) with variable resolution. FIG. 1 shows the global flow to decode and display an OSD picture. The PSI buffer 312a contains the coded picture, for example: a Teletext data to be displayed within an OSD picture. The CPU 220 decodes (1) the Teletext data and builds (2) the OSD picture using the Bitblt hardware 272 accelerator. The OSD controller 270 reads (3) the OSD buffer 312b and generates the OSD video that is mixed with MPEG video(4).

Different modes are displayed simultaneously on the screen: A bit-map window 1000 with 2 colors, a still video picture 1010, a 256 colors graphic window 1020, a decimated motion video picture 1030 and a Logo in true color. The OSD controller 270 minimizes the memory required to display service information. The OSD uses a new hardware windowing technique to mix different mode of display such as: Bit map with variable resolution, graphic plane, still video picture and decimated motion video.

Figure 2:
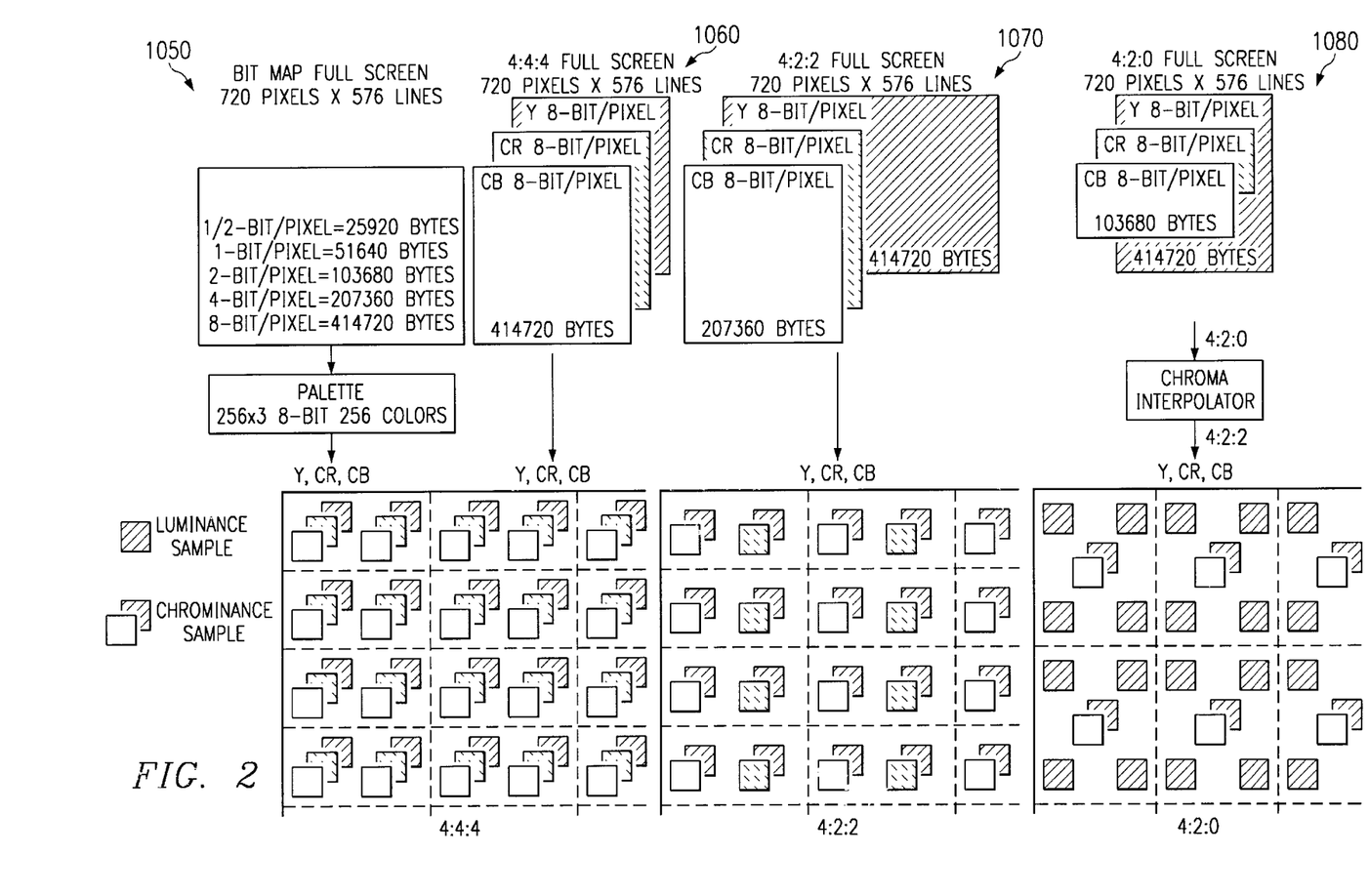
FIG. 2 depicts display modes of an OSD coprocessor of the present invention and their associated memory requirements.

FIG. 2 shows the various modes of display available according to the invention.

In a bit map mode 1050, the frame buffer contains the code of the color of each pixel to be displayed. The number of bit per pixel defines the number of the colors that can be displayed on screen. Two colors require 1-bit per pixel and 256 colors require 8-bit per pixel. This mode is used to display graphic and text. The code of the color addresses the color look up table that contains the three color components with 8-bits each.

Graphic plane, 4:4:4 mode 1060, uses 8_bit per pixel for each color component R,G,B or Y,Cr,Cb. Each pixel requires 24-bits (16 million colors per pixel).

With the 4:2:2 mode 1070 the resolution of the chroma is divided horizontally by two. Each pixel has a luminance component Y and alternately a chrominance component Cr or Cb. This mode is used for video still or motion picture. Each pixel requires 16-bits.

With the 4:2:0 mode 1080 the resolution of the chroma is divided by two horizontally and vertically. Each pixel has a luminance component Y and a chrominance component Cr and Cb for 4 pixels. This mode is used by the MPEG video decoder to the size of the memory required to store a video motion picture. Each pixel requires 12-bits. The chroma interpolator generates the 4:2:2 output format.

The OSD controller 270 can display several modes described above simultaneously on the same screen. Each part of the screen with different display modes uses a window fully programmable in size, in position and priority level. The windows can be overlapped without limitations. The characteristic of each window is defined by a set of attributes stored in SRAM. Those attributes are used to calculate the memory address in real time during display and to control the hardware display system.

Figure 3:
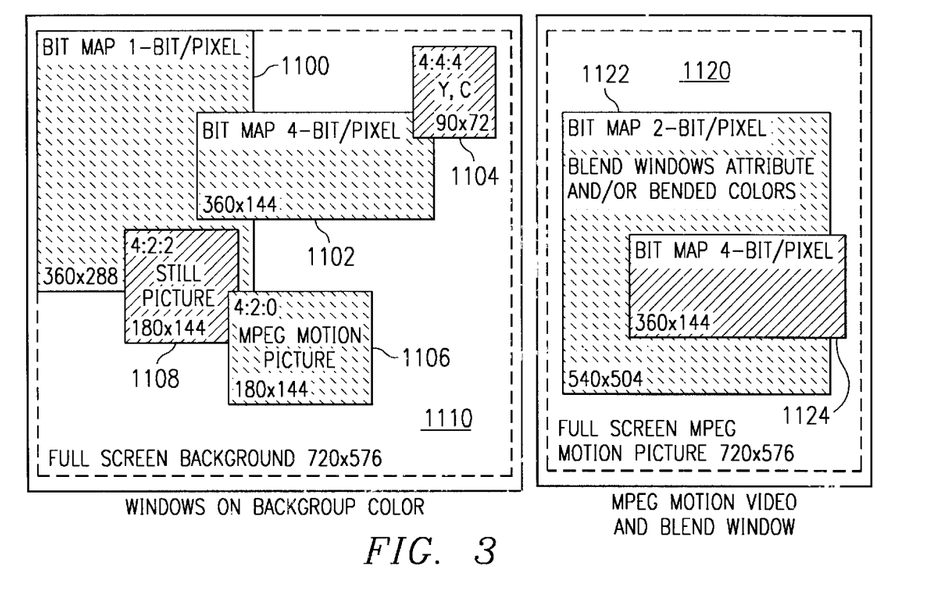
FIG. 3 depicts two representative OSD pictures generated by an OSD coprocessor of the present invention.

FIG. 3 shows typical OSD pictures. The left screen is composed of 5 OSD windows with different characteristics displayed on a full screen background color 1110:

a bit-map window 1100 having 360 pixels by 288 lines with two colors that requires 1-bit per pixel, a bit-map window 1102 having 360 pixels by 144 lines with 16 colors that requires 4-bits per pixel, a graphic window 1104 having 90 pixels by 72 lines with 16 million colors that requires 24-bits per pixel, a still video picture window 1106 having 180 pixels by 144 lines in 4:2:2 format using 24-bits per pixel, an MPEG motion video window 1108 having 180 pixels by 144 lines in 4:2:0 format. The window size and position is generated by the OSD system. The MPEG video decoder generates the content of the window by decimation of the full screen picture.

This OSD picture requires 110 Kbytes memory. Without the OSD controller 270 the memory requirement could be up to 1.24 Mega bytes.

The right screen of FIG. 3 shows another picture composed of 2 OSD windows displayed over a full screen motion video 1120:

a bit-map window 1122 having 540 pixels by 504 lines with two colors that requires 1-bit per pixel. The background color is blended over motion video; and a bit-map window 1124 having 360 pixels by 144 lines with 16 colors that requires 4-bits per pixel.

The memory size is 93 Kbytes using the OSD controller 270 compared to 207 Kbytes without it.

The following illustrates the memory needed for the examples in FIG. 3.

| Windows on Background Color | | |
|---|---|---|
| Window size | | Number of bytes |
| 90 × 72 | 4:4:4 | 19 440 |
| 360 × 288 | 1-bit/pixel | 12 960 |
| 360 × 144 | 4-bit/pixel | 25920 |
| 180 × 144 | 4:2:2 | 51840 |
| 720 × 576 | Background | 0 |
|  | Total | 110160 |
| 720 × 576 | Full screen 4:4:4 | 1 244 160 |
| MPEG Motion Video and Blend Window | | |
| Window size | | Number of bytes |
| 540 × 504 | 2-bit/pixel | 68 040 |
| 360 × 144 | 4-bit/pixel | 25 920 |
| 720 × 576 | Total | 93 960 |
|  | Full screen 4-bit/pixel | 207 360 |

Figure 4:
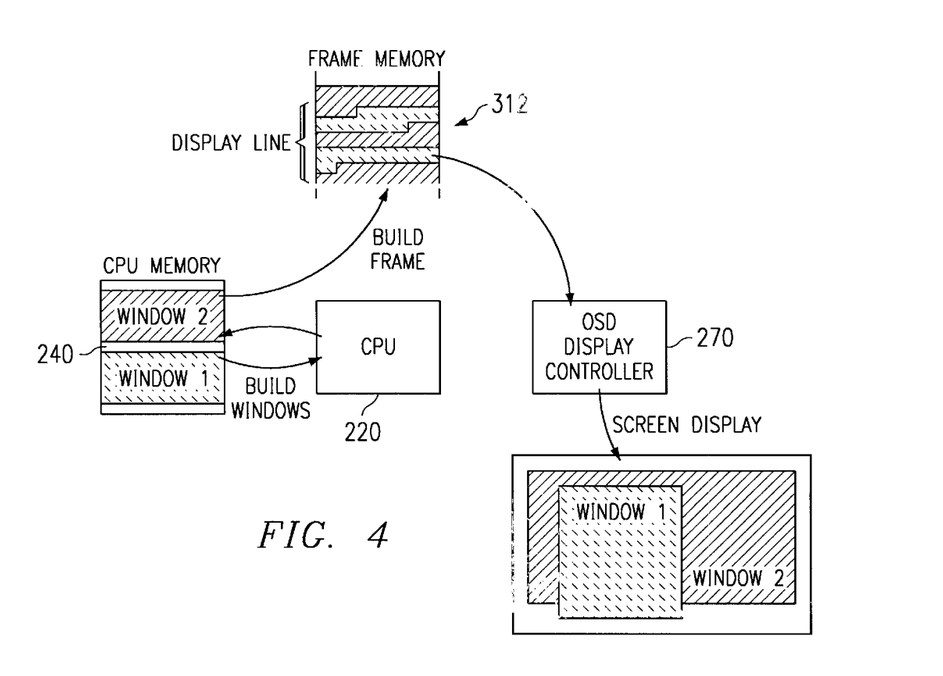
FIG. 4 depicts how a CPU builds windows in a portion of its memory and the windows are used to build a frame in a frame memory which is displayed by an OSD coprocessor of the present invention on a screen display.

As depicted in FIG. 4, in frame mode the CPU 220 and frame use different memory areas. The CPU 220 builds the windows separately in the CPU memory 240 and each window has its own display attributes i.e. display mode, resolution . . . . The new display picture is created by the CPU, by copying sequentially each segment of the window 1 and 2 in such way that the OSD display controller 270 reads the frame memory 312 sequentially and displays line by line from the left upper corner to the right lower corner. The display area that does not contain any OSD data, such as background color or motion video, is not included in the frame memory. Each transition of window, each line, the controller synchronously change the attribute in order to display the window with the corresponding mode. The number of bits to display a pixel of window 1 and 2 can be different.

Figure 5:
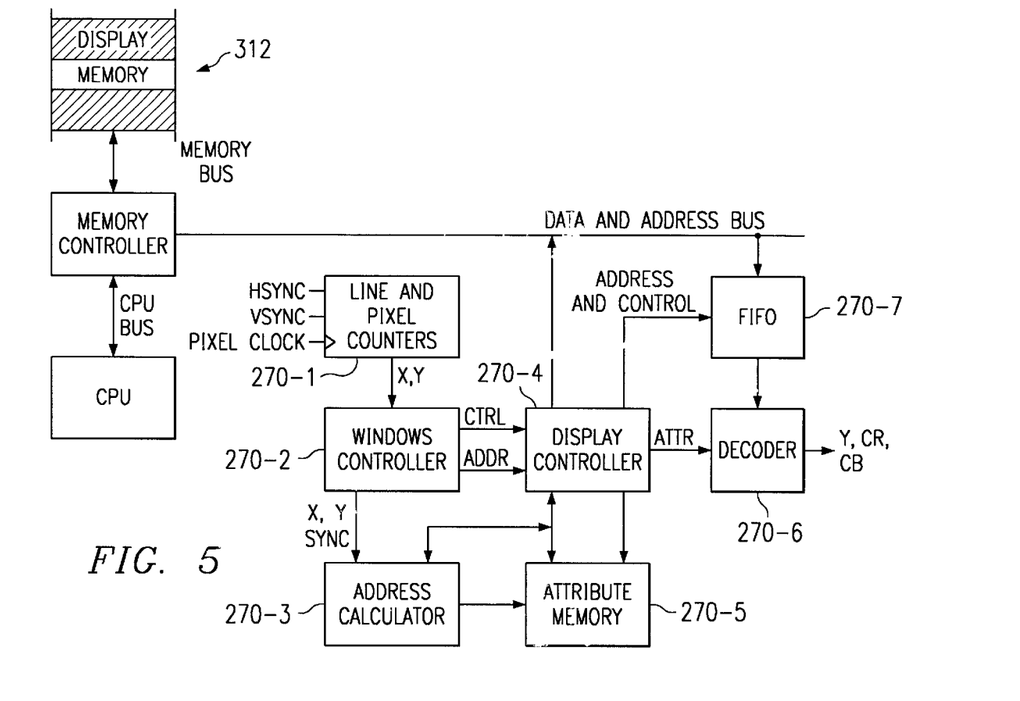
FIG. 5 depicts a high level architectural block diagram of an OSD coprocessor of the present invention and selected interconnections.

A block diagram of the OSD controller 270 is shown FIG. 5.

The pixel and line counter 270-1 receives the pixel clock, generates X, Y that represent the pixel position on the screen and uses the synchronization signals Hsync and Vsync to control screen display.

The windows controller 270-2 contains the position X and Y of each windows to be displayed on the screen. The controller 270-2 compares X, Y position and indicates to the display controller 270-4 each window transition and window number.

The address calculator 270-3 is not used in the frame mode.

For each new window transition the display controller 270-4 reads the new attribute from the attribute memory 270-5. It generates the address for the display memory 312 and loads the FIFO 270-7 with a new block of data. It then generates the attribute for the current window and sends it to the Decoder 270-6.

For each pixel, the decoder 270-6 extracts from the FIFO 270-7 the number of bits corresponding to the current pixel to be displayed. It transforms data bits into pixels.

Figure 6:
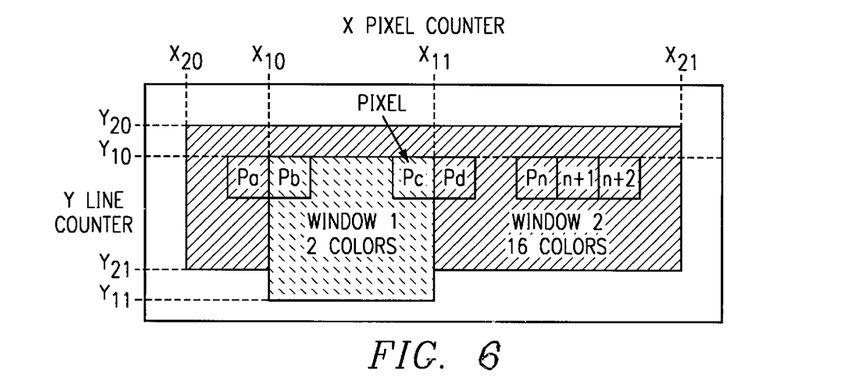
FIG. 6 depicts two windows having different color schemes that illustrate how an OSD coprocessor of the present invention displays two overlapped windows.

The windows attributes are as follows:

Display modes: empty window for decimated video. Bitmap, YCrCb 4:4:4 graphics component, YCrCb 4:2:2 CCIR 601 component and background color Supports blending of bitmap, YCrCb 4:4:4, or YCrCb 4:2:2 with motion video and with an empty window Supports window mode and color mode blending Provides a programmable 256 entries color look up table Outputs motion video or mixture with OSD in a programmable 422 or 444 digital component format Provides motion video or mixture with OSD to the on-chip NTSC/PAL encoder Each hardware window has the following attributes:
window position: any even pixel horizontal position on screen; windows with decimated video have to start from an even numbered video line also
window size: from 2 to 720 pixel wide (even values only) and 1 to 576 lines
window base address
data format: bitmap, YCrCb 4:4:4, YCrCb 4:2:2, and empty bitmap resolution: 1, 2, 4, and 8 bits per pixel
full or half resolution for bitmap and YCrCb 4:4:4 windows
bitmap color palette base address
blend enable flag
4 or 16 levels of blending
transparency enable flag for YCrCb 4:4:4 and YCrCb 4:2:2
output channel control FIG. 6 shows an example of display of two overlapped windows. Window 2 in back is a bit map with 16 colors per pixel. Each pixel requires 4-bits in the frame memory to define the code of the color. The window 1 on top is a bit map with 2 colors per pixel. Each pixel requires 1-bit in the frame memory 312 to define the code of the color. The position and dimension of the window 1 is given by the attributes X__10, X__11, Y-10, Y__11. Horizontally the number of pixel is: X__11-X__10. Vertically the number of lines is: Y__11-Y__10. Same for window 2 with X__20, X__21, Y__20 and Y__21.

Figure 7:
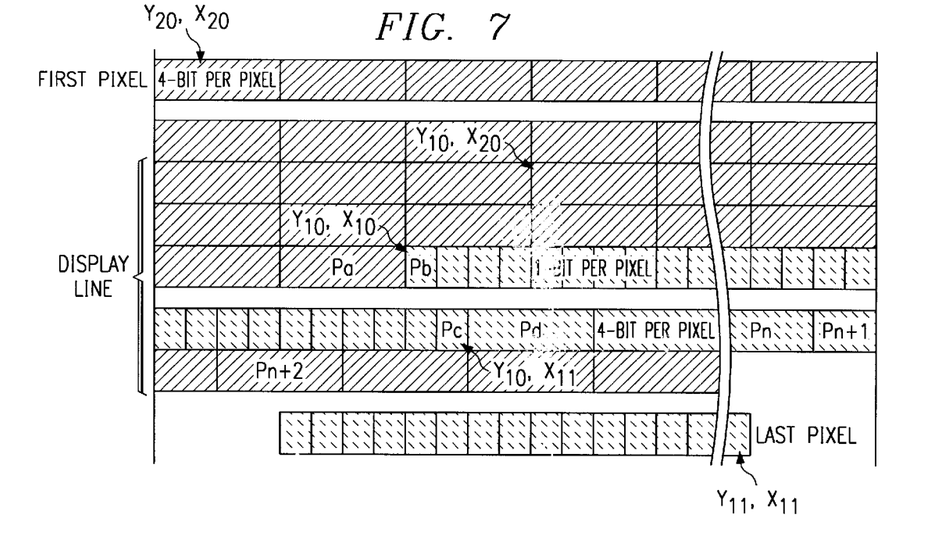
FIG. 7 depicts how a portion of the windows of FIG. 6 are stored in a frame memory.

The display controller 270-4 accesses sequentially the display memory 312 from the first word containing the pixel X__20, Y__20 to the last word containing the pixel X__11, Y__11. Details of the line 20 are shown in FIG. 7. The line begins with the pixels of the window 2, and window 1 starts at X__10, Y__10. Pa is the last pixel of window 2 with 4-bits per pixel and Pb is the first pixel of window 1 that uses 1-bit per pixel. Window 1 ends on Pc and window 2 restarts at Pd and continues until pixel position X__21 (see also FIG. 6).

The same word contains pixels of window 1 and 2. During display the windows controller 270-2 detects the transition between Pa and Pb and controls the data processing after FIFO 270-7 access.

Figure 8:
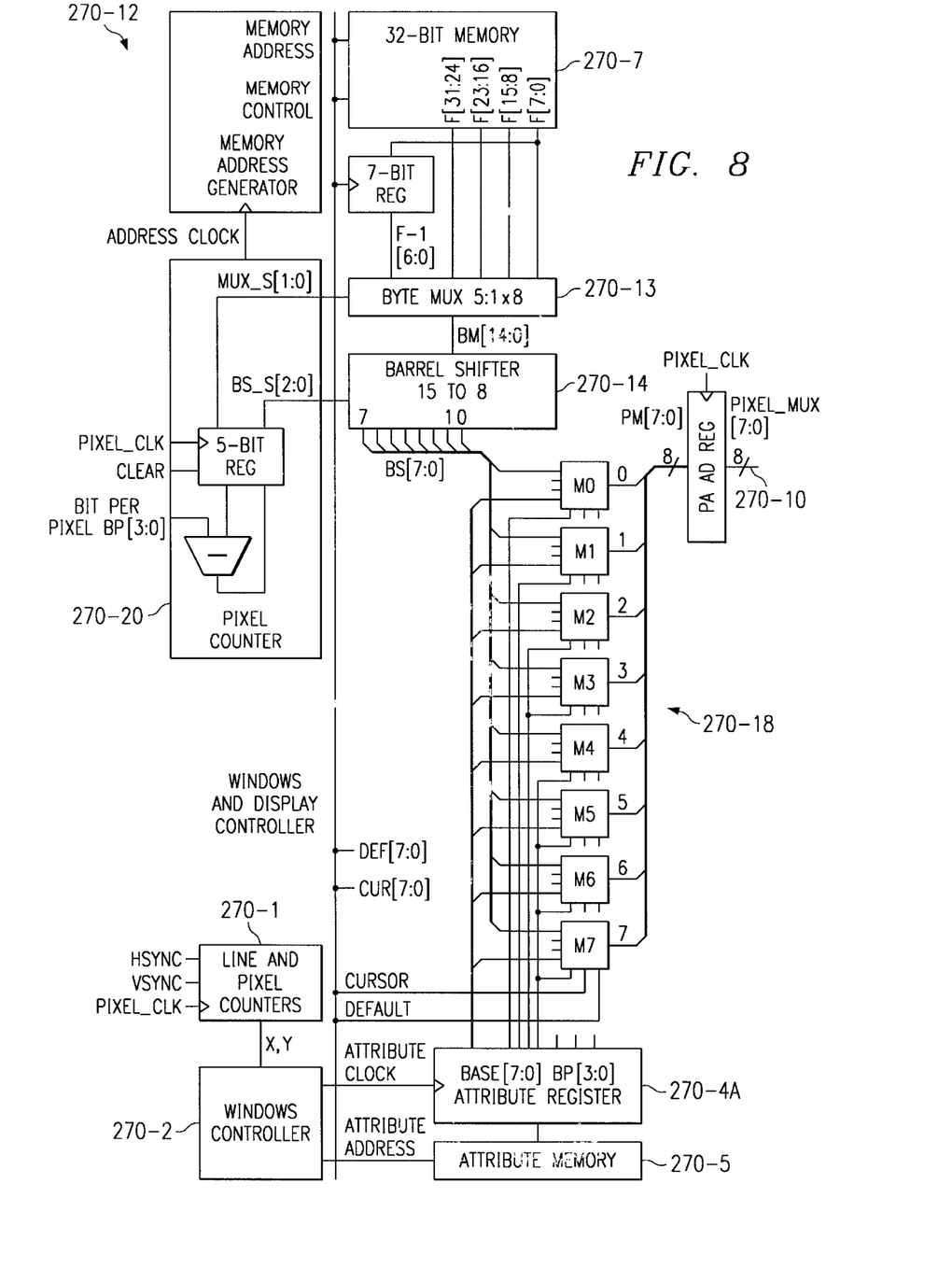
FIG. 8 depicts in more detail selected portions of the blocks of FIG. 5.

Although not explicitly shown in FIG. 5, a pixel selector 270-12 and multiplexer 270-18 shown in FIG. 8 provide the input of the decoder block 270-6 of FIG. 5. The pixel selector 270-12 receives the outputs of the FIFO 270-7, and the multiplexer 270-18 receives the window attributes and control signals from the display controller 270-4. The basic function is to transform data stored in the frame memory 312 into pixels. In case of bit map display, the output, Pixel__Mux[7:0] 270-10 is the address of the CLUT (color look up table). For graphic or still video picture the output is one color component. Pixel__Mux[7:0] 270-10 output is produced by bits coming from the FIFO 270-7 and bits from attribute memory 270-5.

The pixel selector 270-12 receives 32-bit data from the FIFO outputs F[31:0]. The first stage 270-13 selects one of the five bytes F[31:24], F[23:16], F[15:8], F[7:0] and F-1[6:0] (F-l means delayed by one clock sample). The second stage 270-14 is a half barrel shifter that allows shifting right a 15-bit input data by 0 to 7 bit positions. The output of the barrel shifter 270-14 positions the LSB of the code of the pixel to be displayed in Bs[0]. The pixel counter 270-20 provides the control signals for the multiplexer 270-13 and barrel shifter 270-14. Table 2 shows the effect of the control Mux__S[1:0] on the byte selection and Table 3 shows the output of the barrel shifter in function of Bs__S[2:0]. Table 4 combines Tables 2 and 3 and shows the bits of the FIFO selected at the output of the barrel shifter as a function of the 5-bit pixel counter.

The multiplexer 270-18 receives data Bs[7:0] from the barrel shifter and Base[7:0] from the attribute register. It is controlled by 4 control bits coming from the attribute register 270-4A, and cursor and default signals from display controller 270-4 as shown in Table 5.

TABLES 2, 3, and 5

Pixel Selector and Multiplex Control

| Mux 5:1 × 8 | | |
|---|---|---|
| Control | Byte Mux Outputs | |
| Mux_S [1:0] | Bm [14:8] | Bm [7:0] |
| 0 0 | F-1 [6:0] | F [31:24] |
| 0 1 | F [30:24] | F [23:16] |
| 1 0 | F [22:16] | F [15:8] |
| 1 1 | F [14:8] | F [7:0] |

| Barrel Shifter 15 to 8 | |
|---|---|
| Control Bs_S [2:0] | Bs [7:0] Outputs |
| 0 0 0 | Bm [7:0] |
| 0 0 1 | Bm [8:1] |
| 0 1 0 | Bm [9:2] |
| 0 1 1 | Bm [10:3] |
| 1 0 0 | Bm [11:4] |
| 1 0 1 | Bm [12:5] |
| 1 1 0 | Bm [13:6] |
| 1 1 1 | Bm [14:7] |

Pixel Multipler outputs

| | | Bit per Pixel Bp [3:0] | | | | |
|---|---|---|---|---|---|---|
| Default | Cursor | 8 | 4 | 2 | 1 | Mux output Pm [7:0] |
| 1 | 0 | X | X | X | X | Def [7:0] |
| X | 1 | X | X | X | X | Cur [7:0] |
| 0 | 0 | 0 | 0 | 0 | 0 | Base [7:0] |
| 0 | 0 | 0 | 0 | 0 | 1 | Base [7:1] & Bs [0] |
| 0 | 0 | 0 | 0 | 1 | 1 | Base [7:2] & Bs [1:0] |
| 0 | 0 | 0 | 1 | 1 | 1 | Base [7:4] & Bs [3:0] |
| 0 | 0 | 1 | 1 | 1 | 1 | Bs [7:0] |

TABLE 4

Pixel Selector Control Tables

Mux_S[1:0]
0 0
0 1
1 0
1 1

| Bs_S[2:0] | Bs[7:0] = | Bs[7:0] = | Bs[7:0] = | Bs[7:0] = |
|---|---|---|---|---|
| 1 1 1 | F-1[6:0] & F[31] | F[30:23] | F[22:15] | F[14:7] |
| 1 1 0 | F-1[5:0] & F[31:30] | F[29:22] | F[21:14] | F[13:6] |
| 1 0 1 | F-1[4:0] & F[31:29] | F[28:21] | F[20:13] | F[12:5] |
| 1 0 0 | F-1[3:0] & F[31:28] | F[27:20] | F[19:12] | F[11:4] |
| 0 1 1 | F-1[2:0] & F[31:27] | F[26:19] | F[18:11] | F[10:3] |
| 0 1 0 | F-1[1:0] & F[31:26] | F[25:18] | F[17:10] | F[9:2] |
| 0 0 1 | F-1[0] & F[31:25] | F[24:17] | F[16:9] | F[8:1] |
| 0 0 0 | F[31:24] | F[23:16] | F[15:8] | F[7:0] |

When active Pm[7:0] is equal to the 8-bit default color DEF[7:0] provided by the general control register of the display controller, no data is read from the FIFO.

When active Pm[7:0] is equal to the 8-bit cursor color CUR[7:0] provided by the general control register of the display controller, no data is read from the FIFO.

Bp[3:0]=0000 indicates that the current window is empty and contains 0__bit per pixel or color component. Pm[7:0] is equal to Base[7:0] stored into the attribute register 270-4. In bit-map mode, the Base[7:0] selects one of the 256 colors of the CLUT as a background color.

Bp[3:0]=0001 indicates that the current window contains 1_bit per pixel or color component. Pm[7:0] is equal to Base[7:1] concatenated with Bs[0] from the barrel shifter. In bit-map mode, the Base[7: 1] is the base address of a set of 2_colors of the 256 colors CLUT.

Bp[3:0]=0011 indicates that the current window contains 2 bits per pixel or color component. Pm[7:0] is equal to Base[7:2] concatenated with Bs[1:0] from the barrel shifter. In bit-map mode the Base[7:2] is the base address of a set of 4_colors of the 256 colors CLUT.

Bp[3:0]=0111 indicates that the current window contains 4_bits per pixel or color component. Pm[7:0] is equal to Base[7:4] concatenated with Bs[3:0] from the barrel shifter. In bit-map mode the Base[7:4] is the base address of a set of 16_colors of the 256 colors CLUT.

Bp[3:0]=1111 indicates that the current window contains 8_bits per pixel or color component. Pm[7:0] is equal to Bs[7:0] from the barrel shifter. In bit-map mode the 256 colors in the CLUT are used.

The pixel counter 270-20 provides the control for the pixel selector 270-12, namely Mux_S[1:0] concatenated with Bs_S[2:0]. At the beginning of each frame the pixel counter is reset. It is decremented by 0, 1, 2, 4 or 8 depending on the current window attribute. An address clock signal is generated when the counter hits zero.

The memory address generator 270-30 generates the read address for the FIFO 270-7. For each address clock signal generated by the pixel counter 270-20, a new 32-bit word F[31:0] is sent to the pixel selector 270-12.

The attribute memory 270-5 contains the attributes of the windows to be displayed during the current frame. The attributes that control the pixel selector 270-12 and multiplexer 270-18 are:

Display mode: bit-map, graphic, still video or empty
Number of bits per pixel or color component: 0, 1, 2, 4 or 8 bits
The bit-map CLUT base address The attribute register 270-4A contains the attribute of the current window. The attribute clock transfers the content of attribute memory 270-5 to the register 270-4A when the window changes.

Figure 9:
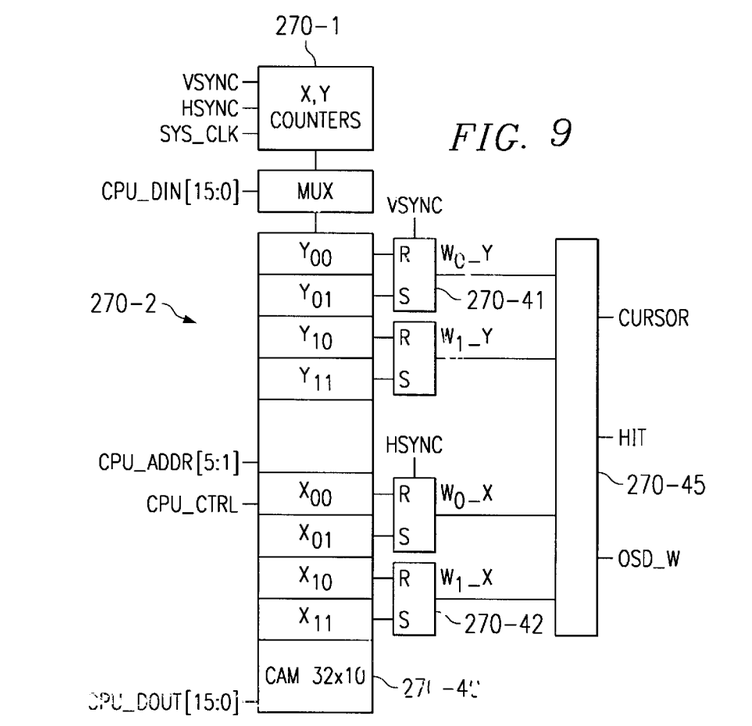
FIG. 9 depicts a portion of a window controller of the present invention.

As depicted in FIG. 9, the windows controller 270-2 is composed of a content addressable memory CAM 270-40, flip flops 270-41, 270-42 and priority encoder 270-45. The CAM contains the attributes of position and size of the windows to be displayed in the current frame. FIG. 9 shows a 32-word CAM 270-40. Each window requires 4 words that indicate horizontally the coordinates of the first and last pixel and vertically the coordinates of the first and last line. A 32_word CAM supports 8 windows. Other sizes of CAM may be employed.

The CAM 270-40 compares the value of the pixel and line counters respectively X and Y. When Y counter matches a value Yn0, a new window starts vertically, and the corresponding RS flip-flop is set Wn_Y=1. When the Y counter matches a value Yn1, the corresponding window ends vertically and RS flip-flop Wn_Y is reset. The process is the same horizontally. Wn_Y and Wn_X are combined to indicate that the X, Y counter is in an active window. The indices "n" indicate the window number. Since several windows can be overlapped, the priority encoder 270-45 indicates the display order on the screen. The indices "n=0" correspond to the cursor that must be always on top. Outputs of priority encoder are HIT and OSD_W; HIT generates the attribute clock and OSD_W generates the attribute memory address corresponding to the active window.

Figure 10:
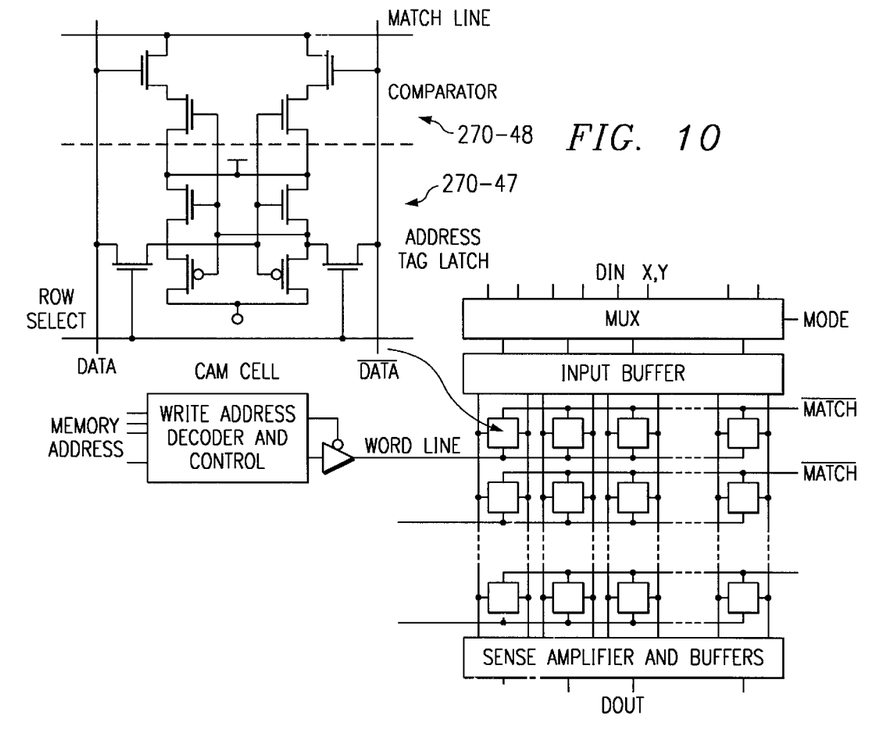
FIG. 10 depicts portions of a memory cell and memory logic utilized in a window controller of the OSD coprocessor of the present invention.

The detail of a CAM cell is shown FIG. 10. The cell contains 2 parts, a 6 transistor RAM cell 270-47 and a 4 transistor comparator circuit 270-48. The CPU 220 loads the CAM with the attributes of position of the windows, memory mode is selected. During the display the associative mode is selected. The line counter Y and pixel counter X are compared to the contents of all Yn and Xn of the CAM. When X or Y is equal to one or several values the corresponding Match lines are active to set or reset a flip-flop as noted in FIG. 9.

Figure 11:
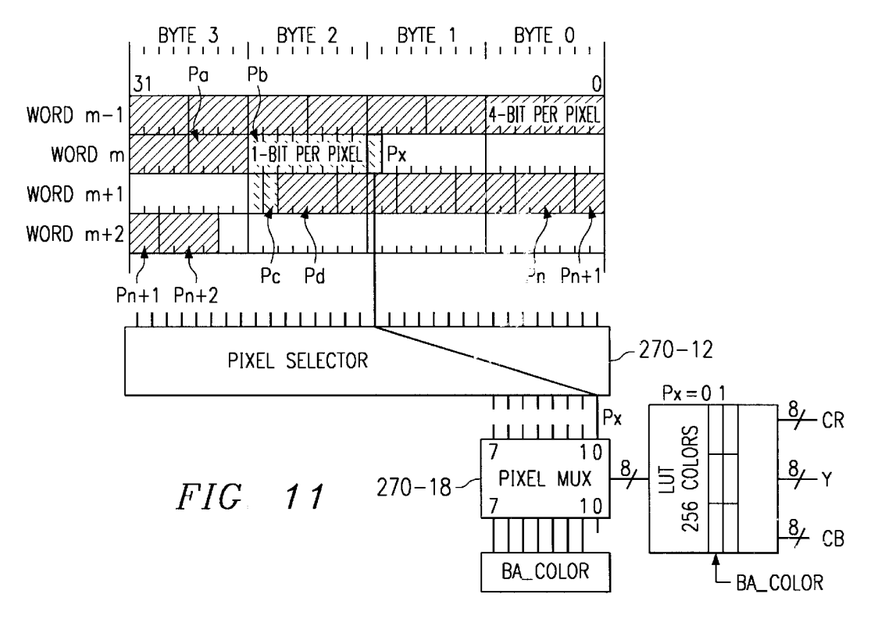
FIGS. 11–13 depict the generation, assembly and display of portions of windows depicted in FIGS. 6 and 7.
Figure 12:
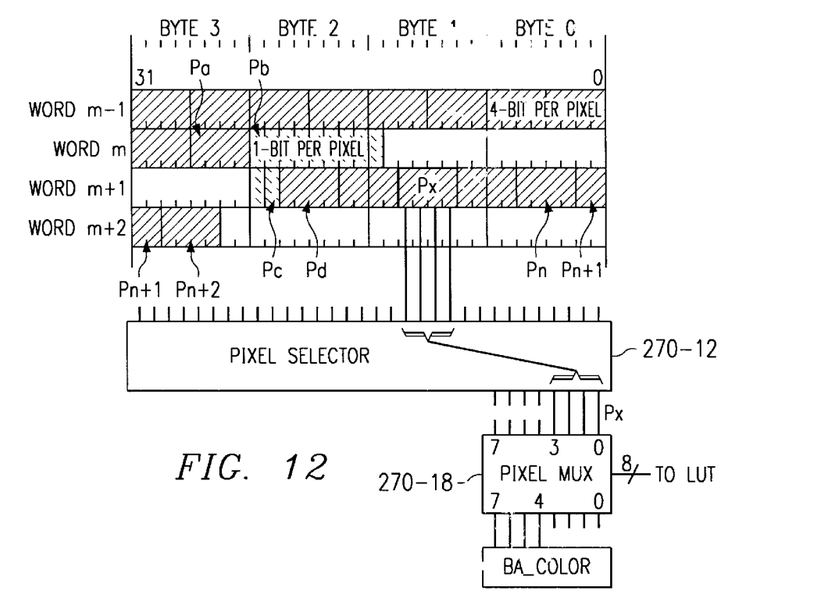
Figure 13:
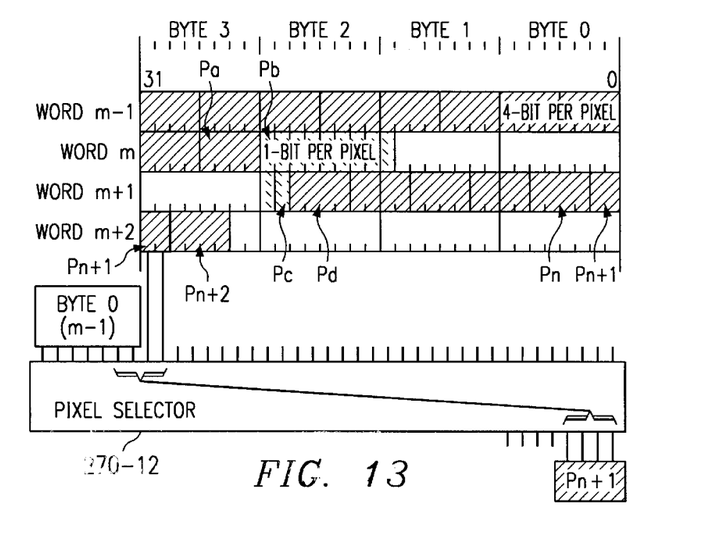

FIGS. 11, 12 and 13 correspond to the generation of the display and frame memory represented in FIGS. 6 and 7.

In FIG. 11, the pixel Px of the window 1 is selected in the 32_bit word "m". The pixel counter is decrement by one each access. The pixel selector places Px at the output Bs[0]. The current window attribute selects 1_bit per pixel. The pixel multiplexer selects Base[7:I] and concatenates with Px to form the output Pixel_Mux[7:0]. In bit-map mode Pixel_Mux[7:0] selects 2 colors of the CLUT. Base[7: 1] is the base address of the CLUT. FIG. 12 shows the generation of a pixel Px for the window 2 that use 4_bits per pixel in bit-map mode. The pixel selector places Px at the output Bs[3:0]. The pixel multiplexer selects Base[7:4] and concatenates with Bs[3:0] to form the output Pixel_Mux[7:0] that selects one of the 16 colors of the CLUT. Base[7:4] is the base address of the CLUT. 16 CLUT of 16 colors can be selected with the window attributes.

Figure 14A:
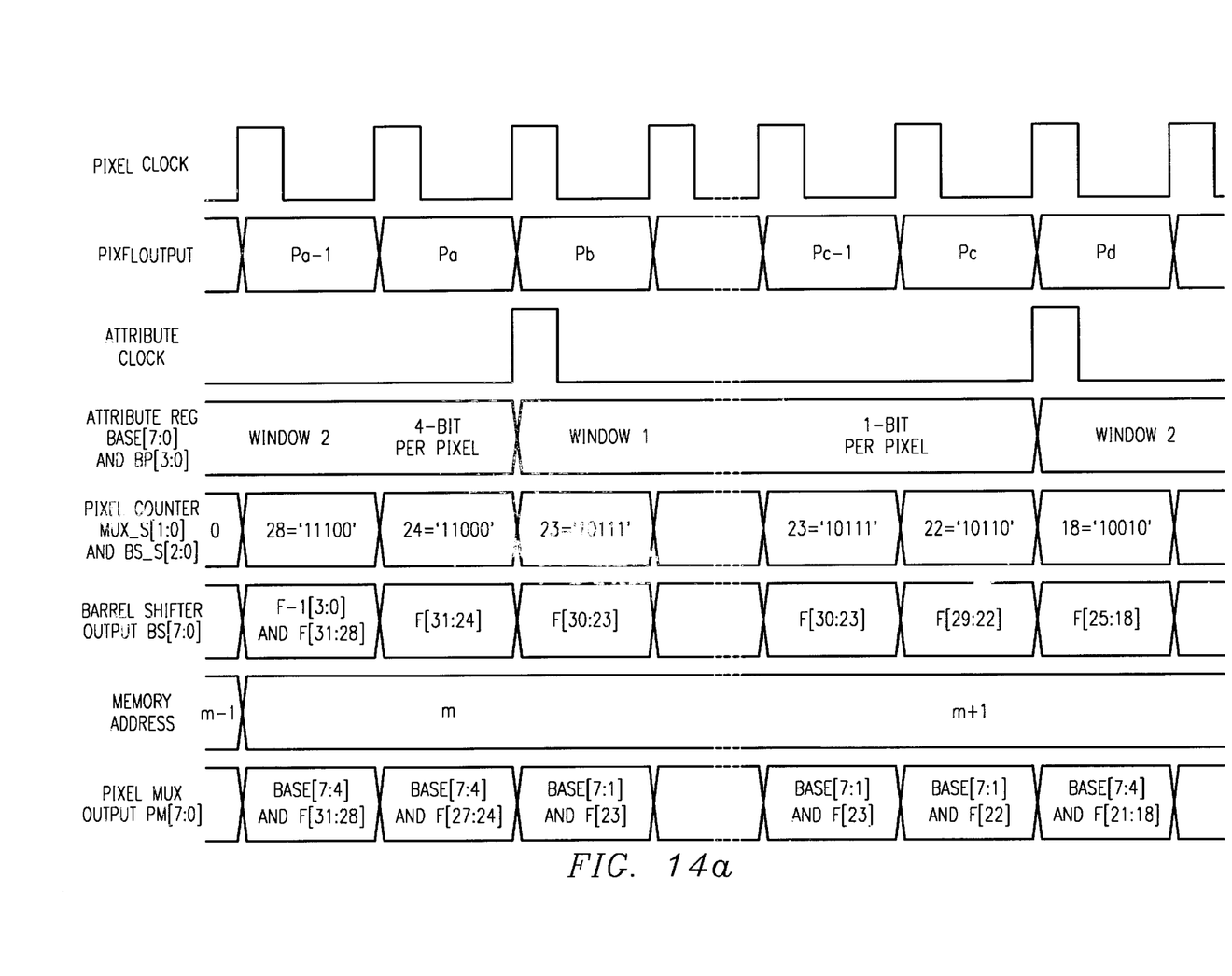
FIG. 14a depicts representative window transition timings, such as those for FIGS. 6 and 7.
Figure 14B:
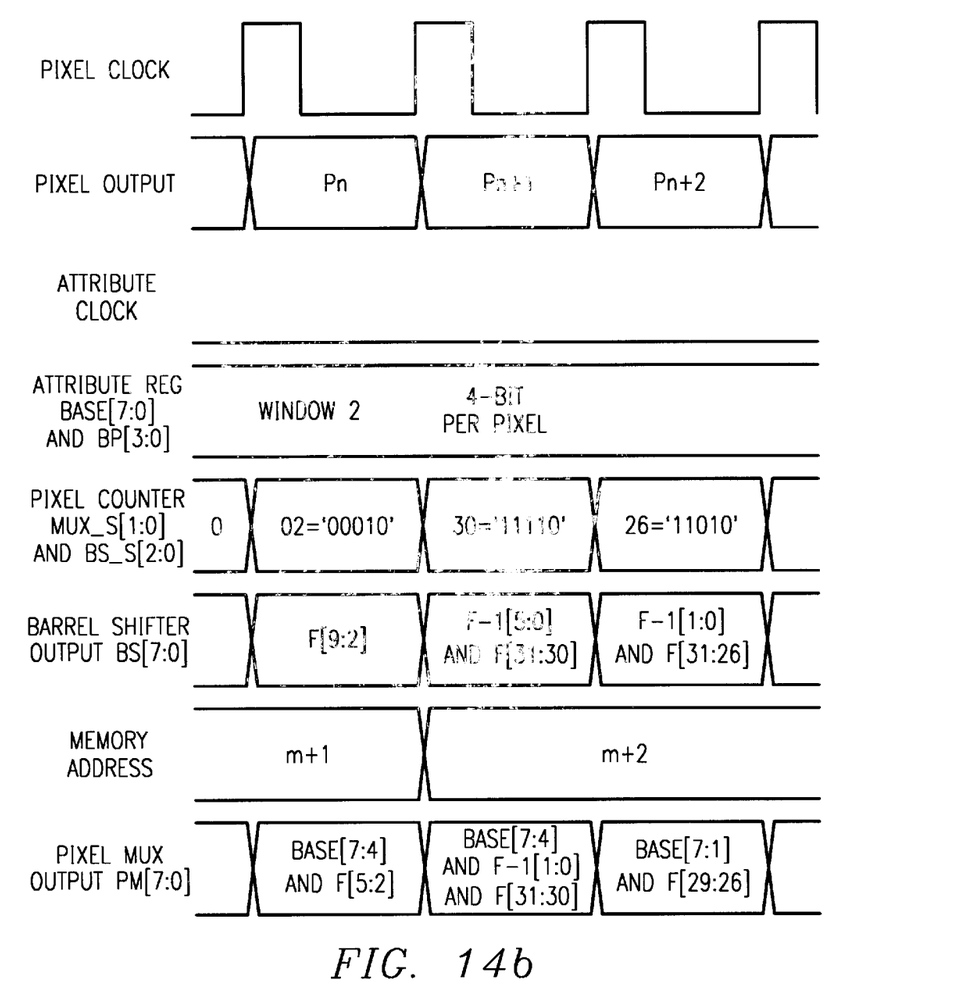
FIG. 14b depicts representative pixel selection and multiplexer timings for FIG. 13.

FIG. 13 shows a specific case of the window 2 where Pn+1 has its 2 msb's in the word m+1 and 2 lsb's in word m+2. Word m+2 is currently selected at the output of the FIFO and the 7 lsb bits of word m+1 are maintained in the 7_bit register F-1 [6:0]. Pixel selector takes F-1[1:0] concatenated with F[31:30] to generate Bs[3:0]. The corresponding timing is shown in FIG. 14b. At Pn+1, the pixel counter equals 30. The barrel shifter output generates F-i [5:0] concatenated with F[31:30]. The current FIFO address is word m+2 and the Pixel_Mux output is Base[7:4] & F−1[1:0] & F[31:30]. At pixel Pn+2 the pixel counter is decrement by 4, and the pixel selector selects the next 4_bits of word m+2.

In FIG. 6, the window 1 is on top of window 2. The CAM of the window controller is loaded with window 1 attributes position on top of window 2. The window displayed on top has the lower indices. Pixel Pa is last pixel for this portion of window 2 in the frame memory, the next bits contain the code of color of window 1, the first bit is Pb. During the same line window 1 ends at Pc and window 2 restarts at Pd. Each of these window transitions are detected by the window controller that generates the attribute clock (see FIG. 8) to change the current display attribute stored in register 270-4A, as shown in timing FIG. 14a. For Pa−1 and Pa the Pixel counter is decrement by 4 each pixel. After the attribute clock, Bp[3:0]=1 (see also FIG. 8) decrements the counter by 1 each pixel.

In bit-map mode the frame memory contains the code of the color, 1,2,4 or 8 bits per color depending on the attributes. The code of the color concatenated with the CLUT color base attribute selects a color from the CLUT. The CLUT contains 3 color components, one component for Luma and two components for Chroma.

When the current window is graphic, the CLUT is not used. For each pixel there are 3 identical accesses to the bit-map mode to extract the 3 color components from the frame memory. There are 3 accesses during a pixel.

In a still video picture the CLUT is not used. Still video reduces Chroma bandwidth. For each pixel there are 2 accesses identical to the bit-map mode to extract one Luma component and chroma component Cr or Cb (alternately each pixel) from the frame memory.

When the picture is empty, the mode is bit-map with 0-bit per pixel. This mode is used to generate a window with a background color or a decimated motion video picture coming from the MPEG video decoder.

The pixel selector allows the hardware to mix different modes of display. The pixel selector and multiplexer hardware, its control, the window controller, the window attribute generation and the flow of data from the frame memory to the Pixel_Mux output allows the different display modes for different resolution.

The frame memory contains a description of the current displayed picture. The Or description is done sequentially starting from the first upper left corner of a window "n" to the last lower right corner of a window "m". Only the active windows need to be described, not the full screen, background color or motion video.

The description is done pixel per pixel, the number of bits to describe one pixel can vary for each window. Each transition of a window is indicated by the attributes of position stored into the CAM. The window controller selects the attribute of the corresponding window in real time during display.

The pixel selector selects the number of bits corresponding to the current pixel to be displayed. The complementary bits to form the 8_bit pixel output are obtained by concatenation of selected data bits from the frame and a window attribute from the attribute memory.

When the current window is a bit-map, the Pixel_Mux output selects a color from the CLUT. The CLUT contains the 3 color components.

When the current window is graphic, the CLUT is not used. For each pixel there are 3 accesses identical to the bit-map mode to extract the 3 colors components from the frame memory.

In still video picture the CLUT is not used. For each pixel there are 2 accesses identical to the bit-map mode to extract the 2 color components from the frame memory. Luma is extracted each pixel and the chroma component Cr or Cb is alternately extracted for each pixel.

When the picture is empty the mode is bit-map with 0_bit per pixel. This mode is used to generate a window with a background color or a decimated motion video picture coming from the MPEG video decoder.

Although exemplary embodiments of the invention are described above in detail, this does not limit the scope of the invention, which can be practiced in a variety of embodiments.

What is claimed is:

1. An apparatus for providing pixel data for use in an on-screen display, comprising:
    a pixel memory for storing pixel data representative of pixels for use in producing the on-screen display;
    a window controller having an input for receiving information indicative of a current pixel position in the on-screen display, said window controller responsive to said current pixel position information for providing window information indicative of an active window of the on-screen display in which the current pixel position is located, wherein said window controller includes a prioritizer for selecting said active window from among a plurality of fierier active windows in which the current pixel position is also located;
    an attribute indicator coupled to said window controller and responsive to said window information for providing information indicative of a data format used by said pixel memory to represent the pixels associated with said active window; and
    a pixel selector coupled to said attribute indicator and said pixel memory, said pixel selector responsive to said data format information for obtaining from said pixel memory the pixel data associated with said active window.

2. A method of providing pixel data for use in an on-screen display, comprising:
    providing information indicative of a current pixel position in the on-screen display;
    in response to said current pixel position information, providing window information indicative of an active window of the on-screen display in which the current pixel position is located;
    providing information indicative of a data format used by a pixel memory to represent pixels associated with said active window, wherein the data format information includes information indicative of a number of data bits per pixel used by the pixel memory to represent the pixels of said active window; and
    responsive to said data format information, obtaining from the pixel memory pixel data associated with said active window.

3. The method of claim 2, including selecting said active window from among a plurality of further active windows in which the current pixel position is also located.

4. The method of claim 2, including storing in an attribute memory information indicative of a plurality of data formats used by the pixel memory to represent pixels of respective ones of a plurality of windows included in the on-screen display, wherein at least one of said plurality of data formats is different from at least another of said plurality of data formats, and wherein said window information includes address information indicative of a location in the attribute memory where the data format information corresponding to said active window is stored.

5. The method of claim 4, including detecting in response to said current pixel position information a condition wherein said active window in which the current pixel position is located is different from a window in which is located a pixel position that immediately precedes the current pixel position in a display line of the on-screen display, providing a control signal in response to detection of said condition and, responsive to said control signal, loading into an attribute register the data format associated with the pixels of said active window.

6. The method of claim 2, wherein said step of providing window information includes providing information indicative of the respective sizes of a plurality of windows included in the on-screen display and providing information indicative of tee respective positions of said plurality of windows in the on-screen display.

7. The method of claim 2, including providing a pixel clock, said obtaining step including obtaining the pixel data responsive to said pixel clock and said number of data bits per pixel.

8. The method of claim 2, including providing information for addressing a color look up table which includes colors for use in the on-screen display and, responsive to said data format information, combining a portion of said color look up table addressing information with pixel data obtained from the pixel memory.

9. An apparatus for providing pixel data for use in an on-screen display, comprising:

a pixel memory for storing pixel data representative of pixels for use in producing the on-screen display;

a window controller having an input for receiving information indicative of a current pixel position in the on-screen display, said window controller responsive to said current pixel position information for providing window information indicative of an active window of the on-screen display in which the current pixel position is located;

an attribute indicator coupled to said window controller and responsive to said window information for providing information indicative of a data format used by said pixel memory to represent the pixels associated with said active window, wherein the data format information includes information indicative of a number of data bits per pixel used by said pixel memory to represent the pixels of said active window; and a pixel selector coupled to said attribute indicator and said pixel memory, said pixel selector responsive to said data format information for obtaining from said pixel memory the pixel data associated with said active window.

10. An apparatus for providing pixel data for use in an on-screen display, comprising:

a pixel memory for storing pixel data representative of pixels for a plurality of windows for use in producing the on-screen display;

a window controller having an input for receiving information indicative of a current pixel position in the on-screen display, said window controller responsive to said current pixel position information for providing window information indicative of an active window of the plurality of windows in which the current pixel position is located;

an attribute indicator coupled to said window controller and responsive to said window information for providing information indicative of a data format selected from a plurality of data formats used by said pixel memory to represent the pixels associated with said plurality of windows;

a pixel selector coupled to said attribute indicator and said pixel memory, said pixel selector responsive to said data format information for obtaining from said pixel memory the pixel data associated with said active window; and wherein pixel data for said active window is stored in the pixel memory in a first data format and pixel data of at least another of said plurality of windows is stored in the pixel memory in a diff-rent data format of the plurality of data formats.

11. The apparatus of claim 10, wherein said attribute indicator includes an attribute memory for storing therein information indicative of a plurality of data formats used by said pixel memory to represent pixels of respective ones of a plurality of windows included in the on-screen display, wherein at least one of said plurality of data formats is different from at least another of said plurality of data formats, said window information including address information indicative of a location in said attribute memory where the data format information corresponding to said active window is stored.

12. The apparatus of claim 11, wherein said window controller is responsive to said current pixel position information for detecting a condition in which said active window where the current pixel position is located is different from a window in which is located a pixel position that immediately precedes the current pixel position in a display line of the on-screen display, said window controller for providing a control signal in response to detection of said condition, said attribute indicator including an attribute register coupled to said attribute memory, said attribute register coupled to said window controller and responsive to said control signal for loading into said attribute register the data format associated with the pixels of said active window.

13. The apparatus of claim 10, wherein said window controller includes a content addressable memory which contains information indicative of the respective sizes of a plurality of windows included in the on-screen display and indicative of the respective positions of said windows in the on-screen display.

14. The apparatus of claim 10, wherein the data format information includes information indicative of a number of data bits per pixel used by said pixel memory to represent the pixels of said active window.

15. The apparatus of claim 14, including a pixel counter coupled to said attribute indicator and said pixel selector, said pixel counter having an input for receiving a pixel clock, said pixel counter responsive to said pixel clock and said number of data bits per pixel for controlling said pixel selector to obtain from said pixel memory the pixel data associated with said active window.

16. The apparatus of claim 10, wherein said attribute indicator is further for providing information for addressing a color look up table which includes colors for use in the on-screen display.

17. The apparatus of claim 16, including a multiplexer coupled to said attribute indicator and said pixel selector, said multiplexer responsive to said data format information for combo, at an output thereof, pixel data obtained from said pixel memory and a portion of said color look up table addressing information.

* * * * *